Figures 1, 2, 3:
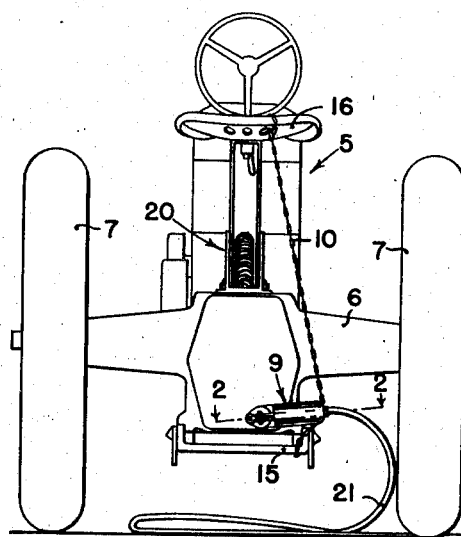

Oct. 27, 1942.  F. T. COURT  2,299,879
FIRE PUMP
Filed Feb. 14, 1940

INVENTOR.
FRANK T. COURT
BY
ATTORNEYS

Patented Oct. 27, 1942

2,299,879

UNITED STATES PATENT OFFICE 2,299,879

TIRE PUMP

Frank T. Court, Moline, Ill., assignor to Deere & Company, Moline, Ill., a corporation of Illinois Application February 14, 1940, Serial No. 318,865

3 Claims. (Cl. 230—39)

The present invention relates generally to appliances for motor vehicles and more particularly to a portable air pump for temporary attachment to the existing power take-off shaft of a rubber-tired tractor for furnishing air for the tires.

With the increasing use of pneumatic tires on farm implements of all kinds, and particularly of the large size tires on tractors, the problem of keeping these tires properly inflated has become more and more acute. The great majority of all farms are remote from roadside air pump facilities and it becomes necessary either to take the tire in a truck for many miles to the nearest service station having air under pressure, or to pump the tire up by hand—an extremely arduous task. A great majority of tractors are constructed with a power take-off shaft projecting from the transmission mechanism, however, and this provides a convenient point of connection to which an air pump might be connected. As this shaft is used for other service, the pump must be readily attachable and detachable.

The principal object of the present invention, therefore, is to provide a new and improved portable air pump which can be temporarily attached to the existing power take-off shaft of a tractor for the purpose of inflating pneumatic tires.

Still another object relates to the simplification of the pump structure by supporting it entirely on a bearing on the power take-off shaft and merely tying it to the tractor body to prevent the pump housing from rotating with the shaft during operation. More specifically, it is an object of my invention to provide means for holding the pump against turning while providing for yieldingly absorbing vibration but securing the pump against bodily swinging in either direction of rotation.

These and other objects and advantages of the present invention will become apparent after a consideration of the following detailed description of a preferred embodiment thereof, reference being had to the appended drawing, in which Figure 1 is a rear view of a rubber-tired tractor showing a tire pump embodying the principles of my invention mounted on the power take-off shaft;

Figure 2 is a sectional view, drawn to enlarged scale, taken substantially along the line 2—2 in Figure 1; and Figure 3 is a partial section, drawn to reduced scale, as viewed from the line 3—3 in Figure 2.

Referring now to the drawing, reference numeral 5 indicates a tractor having a rear axle housing 6 carried on a pair of laterally spaced rubber-tired driving wheels 7. A power take-off shaft 8 projects rearwardly from the lower portion of the rear axle housing 6 and is suitably connected to and driven by the tractor engine in a manner well known in the art.

The tire pump embodying the principles of my invention is indicated in its entirety by the reference numeral 9 and is shown mounted on the end of the power take-off shaft 8 in operating position. As the pump is substantially entirely supported by the power take-off shaft, it must be held stationary during operation to prevent it from rotating with the shaft. To this end a chain 10 is secured intermediate its ends to the housing 11 of the pump by means of a bolt 12 screwed into a threaded aperture 13 in a lug 14 provided at the outer end of the housing. One end of the chain 10 is suitably attached to a rigid portion of the tractor body, such as the drawbar 15, while the other end is fastened to the driver's seat 16. The seat 16 is yieldingly mounted on a spring suspension 20, and by sitting on the seat or pulling it down before fastening the chain 10, the latter is pulled tight when the seat is released supplying an initial spring pressure against the pump housing 11, thereby firmly restraining the latter against rotation with the power take-off shaft 8, while it is cushioned against vibration by the action of the spring 20. The pump is provided with a flexible air hose 21 having an air chuck 22 which is adapted to connect to the standard valve stem with which most present day pneumatic tires are equipped.

The pump 9 is preferably, although not necessarily, of the type disclosed in Patent No. 2,265,971, granted December 9, 1941, to Paul and Neighbour, and comprises the housing 11, which preferably includes a compression cylinder 23 having one end thereof closed and a mounting sleeve bracket 24 formed integral with the cylinder wall at the other end thereof, the axis of the sleeve 24 being disposed perpendicular to the axis of the cylinder 23. The cylinder 23 and sleeve 24 are connected and braced by suitable webbing 25 for added strength. A piston 26 is slidably disposed within the cylinder 23 and is actuated by a connecting rod 30 to which it is pivotally attached by a wrist pin 31. The wrist pin 31 is passed through aligned openings in the piston and connecting rod and is secured to the latter by means of a cotter pin 29 which extends through aligned holes in the connecting rod and wrist pin. To facilitate assembly, the piston is provided with enlarged openings 28 disposed coaxial with the cotter pin holes, and the cotter pin 29 is inserted into place through one of the openings 28 and spread by means of a tool inserted through the other opening 28. The lower end of the connecting rod 30 is connected to a crank pin 32 which is formed integral with a driving sleeve 33 journaled within the bracket sleeve 24. The interior of the driving sleeve 33 is provided with a pair of diametrically opposite splines 34 and 35 adapted to cooperate with corresponding keyways in the splined power take-off shaft 8, and the ends of the sleeve 33 are formed with shoulder flanges 36 and 37 abutting the end of the sleeve 24 to provide end thrust bearings therefor. For the purpose of facilitating assembly, the sleeve bracket 24 is split into two hemi-cylindrical parts 40 and 41 having two pairs of cooperating lugs 42 and 43 which are held together by bolts 44 and nuts 45, as shown in Figure 3.

The head of the piston 26 is provided with a centrally located raised boss 46 and clamped to the top of this boss is a circular disk retainer 51 of somewhat smaller diameter than the inside diameter of the cylinder 23. A bolt 52 is passed through an opening in the center of the disk 51 and is screwed into a threaded aperture 50 in the boss 46 to secure the disk 51 rigidly thereto. The disk 51 is provided with a number of openings 53 arranged in a small circle about the bolt 52, and the piston head is likewise provided with a circle of holes 54, the latter circle having a somewhat larger diameter than the former so that holes 54 are offset outwardly from holes 53. A cup-shaped washer seal 55 of resilient material such as leather or the like is disposed with its radially extending flange portion 56 in the space between the piston head and disk 51 and adapted to cover the holes 54 when seated against the piston head. The skirt portion 60 of the seal extends upwardly through the space between the outer edge of the disk 51 and the cylinder wall and bears against the latter. The washer seal 55 fits loosely within its confines and is free to move up and down between the disk 51, and piston head as the piston 26 is reciprocated. On the down stroke, or suction stroke of the piston, the friction of the washer skirt 60 against the walls of the cylinder 23, together with the atmospheric air pressure on the under side of the radial flange portion 56 cause the washer seal to bear upwardly against the disk 51, opening the holes 54 and allowing air to flow through the central opening 61 in the washer and the holes 53 in the disk into the cylinder space 63 above the piston. The disk 51 thus acts as a retainer, engaging the seal 55 to move it with the piston. On the up stroke, or compression stroke of the piston, the drag of the washer skirt 60 aided by the pressure of the compressed air on the upper side of the radial flange portion 56, causes the washer seal 55 to bear downwardly against the piston head and close the holes 54, effectively sealing the piston 26 against leakage of air. Both the inner and outer peripheral edges of the washer seal 55 are beveled, as is customary, to secure the most effective seal.

The upper portion of the cylinder 23 is divided by a partition member 62 into a compression chamber 63 between the piston 26 and member 62, and an equalizing or pulsation chamber 64 above the partition 62, the purpose of the pulsation chamber 64 being to smooth out the pressure pulsations and provide a reservoir for holding a limited quantity of air under relatively high pressure and feeding the same into the hose 21 during the down stroke of the piston. This eliminates the excessive instantaneous pressures which would be built up in the air hose if the latter were connected directly to the compression chamber, and greatly lessens the tendency of the air hose to heat up.

The partition member 62 includes a ball check valve cage 65 and a radial flange 66 extending outwardly from the lower end thereof, said flange being turned up adjacent the cylinder wall to provide an annular recess 70 into which the washer skirt 60 extends when the piston is in its uppermost position. The outer edge of the flange 66 engages an abutment comprising a shoulder 71 formed on the cylinder wall and is drawn tightly thereagainst by means to be described presently for the purpose of securing an air tight seal between the compression chamber 63 and pulsation chamber 64. A recess 72 is provided in the center of the partition member 62 to receive the head of the bolt 52 when the piston is at the top of its stroke, and connecting the recess 72 with the pulsation chamber 64 is a cylindrical passageway 73 which is beveled around its upper edge to provide a seat for the ball check valve 74. Guide flanges 75 are provided in the valve cage 65 to hold the ball check valve 74 against lateral displacement and ensure that the latter seats properly each time, and a compression spring 76 bears downwardly upon the ball 74 to hold it yieldingly against its seat. A number of openings 80 in the valve cage 65 adjacent the ball check valve 74 allow the air to flow freely from the valve cage to the pulsation chamber or from pulsation chamber back through the valve cage and out through the air hose 21.

The valve cage 65 is connected with the air hose 21 by means of a connecting plug 81 which also serves to clamp the partition member 62 against the shoulder 71. The lower end of the plug 81 is threaded at 82 and this threaded portion is inserted through an aperture 83 in the cylinder head 84 and is screwed into a threaded aperture formed in the valve cage 65. A flange 85 on the plug 81 bears against the top of the cylinder head 84 limiting the depth to which the plug can be inserted into the cylinder and causing the plug 81 to draw the partition member 62 upwardly against the shoulder 71 when screwed up tight. The joint between the flange 85 and cylinder head 84 is sealed air tight by any suitable gasket 86.

Formed integral with the connecting plug 81 and extending outwardly therefrom is a serrated nipple 90 which is adapted to be inserted into the end of the air hose 21. A passage 91 extends the entire length of the nipple 90 and plug 81 and is enlarged at its lower end where it opens into the valve cage 65 to provide a shoulder 92 against which the upper end of the spring 76 bears.

During operation, the piston 26 is reciprocated in the cylinder 23. On the suction stroke, the spring 76 holds the ball check valve 74 closed, while the cupped washer 60 bears against the disk 51, allowing air to flow through the ports 54 and 53. During the compression stroke, the washer 60 covers the ports 54, compressing air in the compression chamber until the force of the valve spring 76 plus the pressure of air above the valve 74 is overcome, whereupon the valve 74 is opened and the compressed air is forced into the chamber 64 and through the passage 91. At the end of the compression stroke, the ball 74 is reseated, retaining the compressed air.

What I claim as my invention is:

1. For use with a tractor having a power take-off shaft and a spring supported seat, an air pump attachment for said tractor comprising a housing mounted on the power take-off shaft, for support, air compressing means carried by said housing and having driving connection with said power take-off shaft, a flexible securing member fixed to said housing intermediate of its ends, one end of said securing member being adapted for attachment to a rigid portion of the tractor body for holding said housing against rotation in one direction, and the other end of said securing member being adapted for attachment to said spring supported seat in a manner to oppose rotation of said housing in the opposite direction, said spring mounted seat exerting a tension force on said securing member.

2. For use with a tractor having a power take-off shaft and a spring supported seat, an air pump attachment for said tractor comprising a housing rotatably supported on the power take-off shaft, air compressing means carried by said housing and having driving connection with said power take-off shaft, means adapted for attachment to the tractor body for holding the housing against rotation in one direction, and means adapted for attachment to the spring supported seat for holding the housing against rotation in the other direction, said spring supported seat exerting a tension force on said attaching means to take up the slack therein.

3. For use with a tractor having a power take-off shaft and a spring supported seat, a pump attachment for said tractor comprising a housing rotatably supported on the power take-off shaft, pumping means carried by said housing and having driving connection with said power take-off shaft, and fastening means of variable effective length adapted for attachment to any convenient part of the tractor for holding the housing against rotation in one direction and adapted for connection to the spring supported seat for holding the housing against rotation in the other direction, said seat exerting a tension force on said fastening means to take up the slack therein.

FRANK T. COURT.